(12) United States Patent
Yakushijin et al.

(10) Patent No.: US 9,416,893 B2
(45) Date of Patent: Aug. 16, 2016

(54) FLUID CONTROLLER ACTUATOR

(71) Applicant: FUJIKIN INCORPORATED, Osaka-shi (JP)

(72) Inventors: Tadayuki Yakushijin, Osaka (JP); Michio Yamaji, Osaka (JP); Tsuyoshi Tanikawa, Osaka (JP); Keisuke Ishibashi, Osaka (JP); Shinichiro Sasaki, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 57 days.

(21) Appl. No.: 14/409,139

(22) PCT Filed: Jun. 26, 2013

(86) PCT No.: PCT/JP2013/067429
§ 371 (c)(1),
(2) Date: Dec. 18, 2014

(87) PCT Pub. No.: WO2014/010412
PCT Pub. Date: Jan. 16, 2014

(65) Prior Publication Data
US 2015/0323092 A1    Nov. 12, 2015

(30) Foreign Application Priority Data

Jul. 13, 2012  (JP) .................................. 2012-157051

(51) Int. Cl.
*F16K 31/122* (2006.01)
*F16K 21/04* (2006.01)
*F15B 15/02* (2006.01)
*F15B 15/14* (2006.01)

(52) U.S. Cl.
CPC ............. *F16K 31/1221* (2013.01); *F15B 15/02* (2013.01); *F15B 15/1476* (2013.01); *F16K 21/04* (2013.01); *F16K 31/1225* (2013.01); *Y10T 137/7754* (2015.04)

(58) Field of Classification Search
CPC . F16K 31/1221; F16K 31/1225; F16K 21/04; Y10T 137/7754; F15B 15/1476; F15B 15/02

USPC ................... 251/58, 61.2, 61.4, 62–63.6, 331
See application file for complete search history.

(56) References Cited

U.S. PATENT DOCUMENTS 2,675,204 A     4/1954  Johnson
4,955,582 A *   9/1990  Baumann ............ F16K 31/1221
                                                251/331

(Continued)

FOREIGN PATENT DOCUMENTS

JP    61-66274 U    5/1986
JP    62-274182 A   11/1987

(Continued)

OTHER PUBLICATIONS

International Search Report mailed Oct. 15, 2013, issued for PCT/JP2013/067429.

*Primary Examiner* — Marina Tietjen
(74) *Attorney, Agent, or Firm* — Locke Lord LLP

(57) ABSTRACT

There is provided a fluid controller actuator which does not require a plurality of bolts for fixing an inner side spring presser to a casing, in which a configuration is simple and a biasing force of an biasing member can be adjusted from the outside after the assembly. An inner side spring presser includes a shaft portion and a cylinder portion provided at a lower edge portion of the shaft portion, and presses an upper side peripheral edge portion of a through hole of a biasing member by a lower end of the cylinder portion. The shaft portion penetrates an outer side spring presser and extends upwardly. An adjustment screw which positions the inner side spring presser as a lower end abuts against an upper surface of the shaft portion of the inner side spring presser, is screwed to a top wall of a casing.

2 Claims, 2 Drawing Sheets

(56) References Cited

U.S. PATENT DOCUMENTS 6,059,259 A    5/2000   Gregoire et al.
6,547,214 B2   4/2003   Gregoire

FOREIGN PATENT DOCUMENTS

JP    03-107602 A     5/1991
JP    2012-042033 A   3/2012

* cited by examiner

FLUID CONTROLLER ACTUATOR

TECHNICAL FIELD

The present invention relates to a fluid controller actuator, and particularly relates to a fluid controller actuator for driving a valve rod which is vertically moved to open and close a fluid passage in a fluid controller.

BACKGROUND ART

A fluid controller generally includes: a body which is provided with a fluid passage; a valve element which opens and closes the fluid passage; a valve rod which moves the valve element in an opening or closing direction by ascending or descending; and an actuator for driving the valve rod; and so on.

A fluid controller actuator is configured by a biasing member for biasing the valve rod upwardly or downwardly, and a piston which moves the valve rod upwardly or downwardly.

In PTL 1, a fluid controller actuator which uses a biasing member configured by a plurality of disc-shaped diaphragm springs, is disclosed. In particular, the fluid controller actuator in PTL 1 includes: a casing which is attached above a body; a biasing member which is configured by a plurality of disc-shaped diaphragm springs having a through hole at the central portion thereof, and biases a valve rod downwardly by a lower side peripheral edge portion of the through hole; a columnar movable member which is disposed on an upper end surface of the valve rod; a spring receiver which is fitted to an outer periphery of the columnar movable member to be relatively vertically movable and receives the lower side peripheral edge portion of the through hole of the biasing member; an inner side spring presser which presses an upper side peripheral edge portion of the through hole of the biasing member downwardly; a plurality of bolts which fix the inner side spring receiver to the casing; an outer side spring presser which presses an outer peripheral edge portion of the biasing member downwardly; and an operation air introduction chamber which presses the outer side spring presser downwardly as operation air is introduced. In a state where the operation air is not introduced into the operation air introduction chamber, the biasing member is elastically deformed so that a protrusion amount with respect to a shape of protrusion which is downward in a natural state is small, and biases the valve rod downwardly and an outer side spring pressing ring upwardly, respectively. As the operation air is introduced into the operation air introduction chamber, the outer side spring presser is pressed downwardly, and the biasing member is deformed upwardly in a shape of protrusion.

CITED REFERENCE

Patent Literature

PTL 1: U.S. Pat. No. 6,059,259

SUMMARY

Technical Problem

According to the fluid controller actuator in the above-described PTL 1, the inner side spring presser is required to be fixed to the casing by the plurality of bolts, and there is a problem in that a configuration is complicated and assembly takes time and effort. In addition, after the assembly, there is also a problem in that a biasing force of the biasing member cannot be adjusted from the outside.

An object of the present invention is to provide a fluid controller actuator which does not require a plurality of bolts for fixing an inner side spring presser to a casing, in which a configuration is simple and assembly does not take time and effort, and further, in which a biasing force of a biasing member can be adjusted from the outside after the assembly.

Solution to Problem

There is provided a fluid controller actuator according to the present invention including: a casing which is attached above a body; a biasing member which is configured by a plurality of disc-shaped diaphragm springs having a through hole at the central portion thereof, and biases a valve rod downwardly by a lower side peripheral edge portion of the through hole; an inner side spring presser which presses an upper side peripheral edge portion of the through hole of the biasing member downwardly; an outer side spring presser which presses an outer peripheral edge portion of the biasing member downwardly; and an operation air introduction chamber which presses the outer side spring presser downwardly as operation air is introduced. In a state where the operation air is not introduced into the operation air introduction chamber, the biasing member is elastically deformed so that a protrusion amount with respect to a shape of protrusion which is downward in a natural state is small, and biases the valve rod downwardly and the outer side spring presser upwardly, respectively. As the operation air is introduced into the operation air introduction chamber, the outer side spring presser is pressed downwardly, and the biasing member is deformed upwardly in a shape of protrusion. In this fluid controller actuator, the inner side spring presser has a shaft portion and a cylinder portion which is provided on a lower end portion of the shaft portion. The inner side spring presser presses the upper side peripheral edge portion of the through hole of the biasing member by a lower end of the cylinder portion. The shaft portion penetrates the outer side spring presser and extends upwardly. An adjustment screw which positions the inner side spring presser as the lower end abuts against an upper surface of the shaft portion of the inner side spring presser, is screwed to a top wall of the casing.

As the lower end of the cylinder portion of the inner side spring presser is pressed, and the upper surface of the shaft portion of the inner side spring presser is positioned by the adjustment screw, the inner side spring presser is sandwiched between the adjustment screw and the biasing member. Accordingly, the plurality of bolts for fixing an inner side spring member is not required, and thus, a configuration is simple, and assembly does not take time and effort. In addition, after the assembly, as a screwing amount of the adjustment screw may be changed, it is possible to adjust a biasing force of the biasing member from the outside, and to stably obtain necessary pressure for blocking a fluid inflow passage.

It is preferable that a counter plate be fixed to the casing at a position above the outer side spring presser, a piston provided with the through hole into which the shaft portion of the inner side spring presser is inserted be disposed between the top wall of the casing and the counter plate, the piston have a downward projection portion which penetrates the counter plate and in which a lower surface abuts against the upper surface of the outer side spring presser, the operation air introduction chamber into which the operation air is introduced be provided on a side above the piston, the operation air in the operation air introduction chamber can flow to the side above the upper surface of the outer side spring presser from a void formed between the outer peripheral surface of the shaft portion of the inner side spring presser and a peripheral surface of the through hole of the piston, and both of the piston and the outer side spring presser be pressed downwardly by the operation air when the operation air is introduced.

Accordingly, the operation air introduction chamber can be one which is provided on the side above the piston, and can make the configuration simple. As the operation air in the operation air introduction chamber flows into the side above the upper surface of the outer side spring presser, the outer side spring presser is pressed downwardly by the operation air, a force which presses the piston and the outer side spring presser downwardly can be large, and a closing operation of the fluid passage is reliably performed. For this reason, even when the biasing force of the biasing member is large, it is possible to reliably perform an opening operation of the fluid passage at a low output (pressure of the operation air, or the like) of the actuator.

In addition, in this specification, upper and lower parts are referred to as upper and lower parts of the drawings (a body side of the fluid controller is referred to as the lower part, and a casing side of the fluid controller actuator is referred to as the upper part). Hereinafter, for convenience, there is a case where the upper and lower parts are used by being reversed, or the upper and lower parts are used as right and left parts.

Advantageous Effects of Invention

According to a fluid controller actuator of the present invention, since an inner side spring presser is sandwiched between an adjustment screw and a biasing member, a plurality of bolts for fixing an inner side spring member is not required. Therefore, a configuration is simple, and assembly takes less time and effort. In addition, after the assembly, as a screwing amount of the adjustment screw may be changed, it is possible to adjust a biasing force of the biasing member from the outside, and to stably obtain necessary pressure for blocking a fluid inflow passage.

Figure 1:
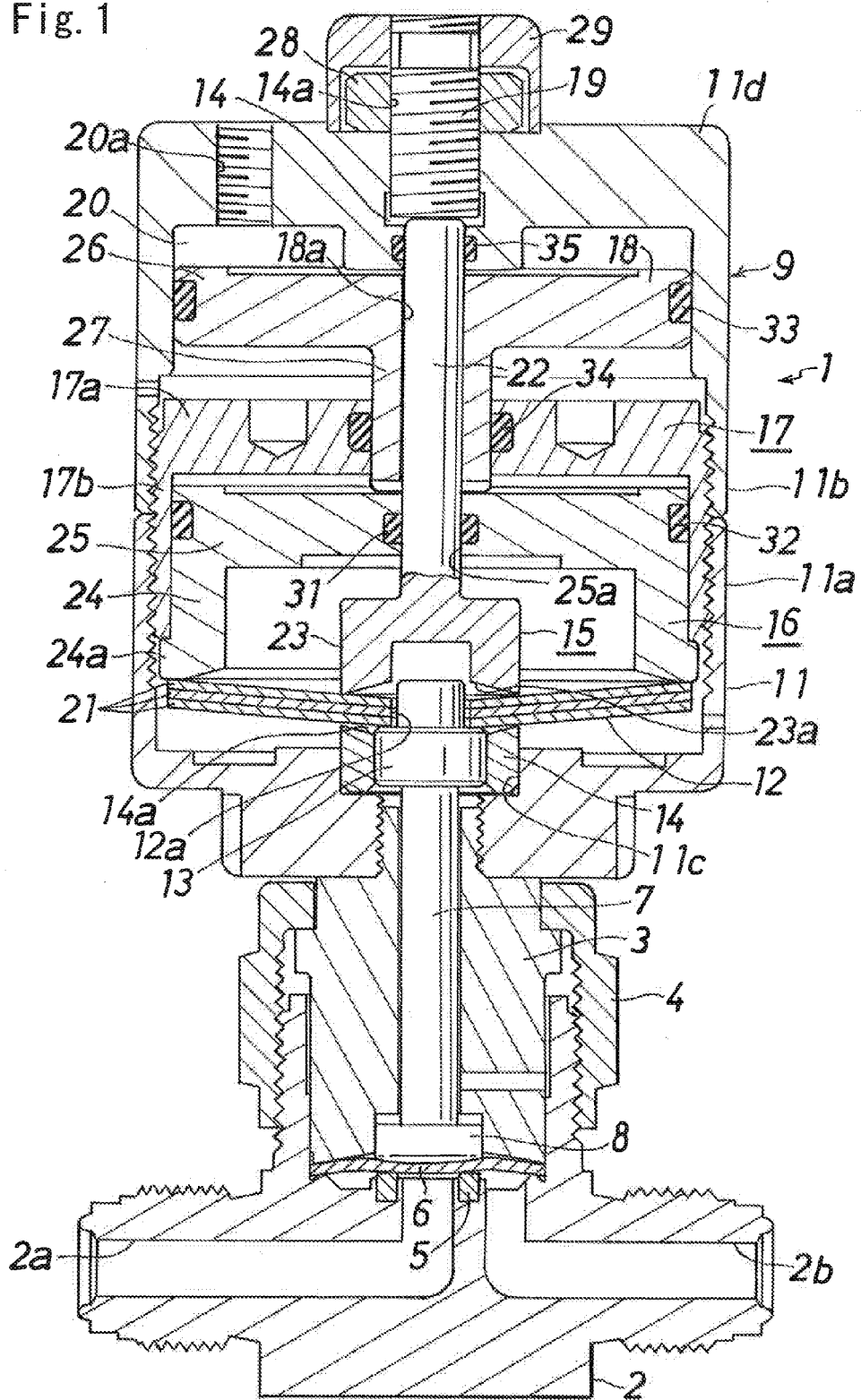
FIG. 1 is a vertical cross-sectional view illustrating Embodiment 1 of a fluid controller actuator according to the present invention, and illustrates a state where a fluid passage is closed.

REFERENCE SIGNS LIST (1): Diaphragm valve
(2): Body
(7): Valve rod
(9): Fluid controller actuator
(11): Casing
(11d): Top wall
(12): Biasing member
(12a): Through hole
(15): Inner side spring presser
(16): Outer side spring presser
(19): Adjustment screw
(20): Operation air introduction chamber
(21): Disc-shaped diaphragm spring
(22): Shaft portion
(23): Cylinder portion

DESCRIPTION OF EMBODIMENT

An embodiment of the present invention will be described with reference to the following drawings.

Figure 2:
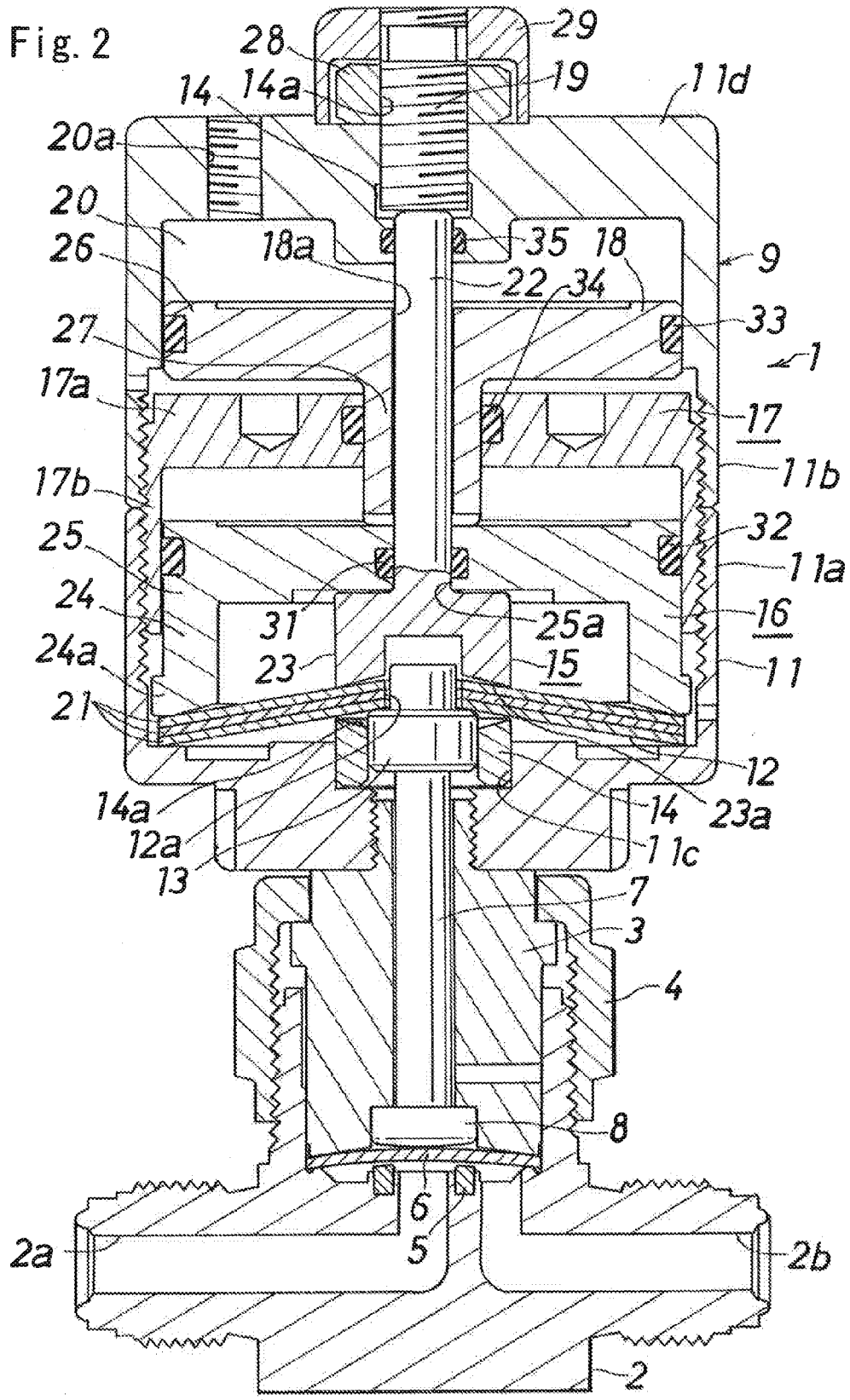
FIG. 2 illustrates a state where a valve rod moves upwardly from a state in FIG. 1 and the fluid passage is opened.

FIGS. 1 and 2 illustrate Embodiment 1 in which a fluid controller actuator according to the present invention is employed in a diaphragm valve.

A diaphragm valve (1) includes: a body (2) which is provided with a fluid inflow passage (2a) and a fluid outflow passage (2b); a bonnet (3) which is fixed above the body (2) by a bonnet nut (4); an annular valve seat (5) which is provided on a peripheral edge of the fluid inflow passage (2a); a diaphragm (valve element) (6) which is pressed to the annular valve seat (5) or is apart from the annular valve seat (5), and opens and closes the fluid inflow passage (2a); a valve rod (7) which is disposed to be movable in the bonnet (3) and moves the diaphragm (6) in an opening or closing direction by ascending or descending; a diaphragm presser (8) which is provided at a lower end portion of the valve rod (7) and which presses the diaphragm (6) downwardly; and a fluid controller actuator (9).

The fluid controller actuator (9) includes: a casing (11) which is attached to the body (2) via the bonnet (3); a disc-shaped biasing member (12) which has a through hole (12a) into which an upper end portion of the valve rod (7) is inserted, and is disposed close to a lower end portion in the casing (11); a flange portion (13) which is provided as one body close to the upper end portion of the valve rod (7), and receives a lower side peripheral edge portion of the through hole (12a) of the biasing member (12); an annular spring receiver (14) which faces the lower side peripheral edge portion of the through hole (12a) of the biasing member (12) from the underneath side; an inner side spring presser (15) which presses the upper side peripheral edge portion of the through hole (12a) of the biasing member (12) downwardly; and an outer side spring presser (16) which presses an outer peripheral edge portion of the biasing member (12) downwardly.

The casing (11) is configured by a lower casing (11a) which is screwed and combined to an upper edge portion of the bonnet (3) and an upper casing (11b) which is screwed to the lower casing (11a). At a joint portion between the lower casing (11a) and the upper casing (11b), a counter plate (17) is disposed. The counter plate (17) is configured by a disc-shaped main body (17a) and a cylindrical projection portion (17b) which extends downwardly from an outer peripheral edge portion of the main body (17a). A male screw portion is provided on an outer peripheral surface of the cylindrical projection portion (17b), a lower portion of the cylindrical projection portion (17b) is provided in the lower casing (11a) and screwed to a female screw portion, and further, an upper portion of the cylindrical projection portion (17b) is provided in the upper casing (11b) and a female screw portion of the cylindrical projection portion (17b) is screwed to the upper portion of the cylindrical projection portion (17b). Accordingly, the lower casing (11a) and the upper casing (11b) are combined via the counter plate (17).

The biasing member (12) is configured by a plurality (three in the drawing) of disc-shaped diaphragm springs (21). Each diaphragm spring (21) has a conical shape in a natural state, is provided with a through hole (21a) at a central portion thereof, and is provided with a plurality of slots (not illustrated) in a shape which extends radially from the through hole (21a). As each diaphragm spring (21) is deformed so that the shape thereof becomes flat or a protrusion amount decreases from a protruded state, an elastic force which returns the shape back to the original protruded state is given to the diaphragm spring (21). Each disc-shaped diaphragm spring (21) illustrated in FIG. 1 is elastically deformed so that the protrusion amount decreases with respect to the natural state in which the central portion has a protruded shape with respect to the peripheral edge portion.

The spring receiver (14) is fitted to an outer periphery of the flange portion (13) of the valve rod (7) to be relatively vertically movable, and is fitted into and fixed to an annular recess (11c) provided on a bottom wall of the casing (11). An upper surface (14a) of the spring receiver (14) is a tapered surface which extends upwardly as approaching in a radially outward direction. In a state illustrated in FIG. 1, the lower side peripheral edge portion of the through hole (12a) of the biasing member (12) abuts against an upper surface of the flange portion (13) of the valve rod (7). A slight void is formed between the lower side peripheral edge portion of the through hole (12a) of the biasing member (12) and the upper surface (14a) of the spring receiver (14).

The inner side spring presser (15) is configured by a shaft portion (22) and a cylinder portion (23) provided at a lower edge portion of the shaft portion (22). A lower surface (23a) of the cylinder portion (23) is a tapered surface which extends downwardly as approaching in a radially outer direction. An outer diameter of the cylinder portion (23) is substantially equal to an outer diameter of the spring receiver (14). The inner side spring presser (15) presses the biasing member (12) downwardly by an outer peripheral portion of the lower surface (23a) of the cylinder portion (23) (lower end of the cylinder portion (23)).

The outer side spring presser (16) is disposed on a side underneath the counter plate (17), and is configured by a cylinder portion (24) and a top portion (25) which blocks an upper end opening of the cylinder portion (24). In the top portion (25), a through hole (25a) for insertion of the shaft portion (22) of the inner side spring presser (15) is provided.

On a side above the counter plate (17), a piston (18) is disposed. The piston (18) is configured by a disc portion (26) and a disc-shaped downward projection portion (27) provided on a lower surface of the disc portion (26). Across the entire disc portion (26) and the downward projection portion (27), a through hole (18a) for insertion of the shaft portion (22) of the inner side spring presser (15) is provided. In the downward projection portion (27) of the piston (18), a lower surface which penetrates the counter plate (17) abuts against the upper surface of the outer side spring presser (16).

The shaft portion (22) of the inner side spring presser (15) penetrates the outer side spring presser (16), the counter plate (17), and the piston (18) and extends upwardly. The through hole (14) is provided at a central portion of a top wall (11d) of the casing (11), and an upper end portion of the shaft portion (22) of the inner side spring presser (15) is fitted into a lower portion of the through hole (14). An upper portion of the through hole (14) has a diameter which is greater than that of a lower portion, and a female portion (14a) is provided in the upper portion of the through hole (14). An adjustment screw (19) which positions the inner side spring presser (15) as the lower end abuts against an upper end surface of the shaft portion (22) of the inner side spring presser (15), is screwed to the female portion (14a). The adjustment screw (19) is fixed in order not to be loosened at a normal time by a locknut (28). The adjustment screw (19) and the locknut (28) are covered by a cover (29).

A space between the top wall (11d) of the casing (11) and the upper surface of the piston (18) is an operation air introduction chamber (20). An introduction port (20a) for introducing the operation air into the operation air introduction chamber (20) is provided in the top wall (11d) of the casing (11).

The operation air in the operation air introduction chamber (20) can flow to the side above the upper surface of the outer side spring presser (16) from the void which is formed between the outer peripheral surface of the shaft portion (22) of the inner side spring presser (15) and a peripheral surface of the through hole (18a) of the piston (18). Therefore, when the operation air from the introduction port (20a) is introduced, both the piston (18) and the outer side spring presser (16) are pressed downwardly by the operation air.

Between the through hole (25a) of the top portion (25) of the outer side spring presser (16) and the shaft portion (22) of the inner side spring presser (15), an O-ring (31) is provided. Between the top portion (25) of the outer side spring presser (16) and the cylindrical projection portion (17b) of the counter plate (17), an O-ring (32) is provided. Accordingly, the operation air on a side above the upper surface of the outer side spring presser (16) is prevented from being introduced further down than this, and the outer side spring presser (16) is movable downwardly with respect to the inner side spring presser (15) and the counter plate (17).

In addition, between the outer periphery of the disc portion (26) of the piston (18) and the upper casing (11b), an O-ring (33) is provided. Between the through hole of the counter plate (17) and an outer periphery of the downward projection portion (27) of the piston (18), an O-ring (34) is provided. Accordingly, the operation air is not introduced between the lower surface of the disc portion (26) of the piston (18) and an upper surface of the counter plate (17), and the piston (18) is movable downwardly with respect to the upper casing (11b) and the counter plate (17).

In addition, between the upper end portion of the shaft portion (22) of the inner side spring presser (15) and the through hole (14) of the top wall (11d) of the casing (11), an O-ring (35) is provided. Accordingly, even when a position adjustment of the inner side spring presser (15) is performed, the operation air in the operation air introduction chamber (20) is prevented from leaking to the outside.

In a state where the fluid inflow passage (2a) illustrated in FIG. 1 is blocked, the operation air is not introduced into the operation air introduction chamber (20). The outer peripheral edge portion of the biasing member (12) presses the outer side spring presser (16) upwardly, and the piston (18) in which the lower surface of the downward projection portion (27) abuts against the upper surface of the outer side spring presser (16) is pushed upwardly by an upward force of the biasing member (12). As an annular protrusion portion (24a) provided on the outer periphery of the lower end portion of the cylinder portion (24) abuts against the lower end surface of the cylindrical projection portion (17b) of the counter plate (17), a further upward movement of the outer side spring presser (16) is interrupted. The piston (18) moves upwardly with the outside spring presser (16) as one body, and abuts against the top wall (11d) of the casing (11). According to this, a further upward movement is suppressed.

At a central portion of the biasing member (12), the lower side peripheral edge portion of the through hole (12a) of the biasing member (12) abuts against the upper surface of the flange portion (13) of the valve rod (7). At the same time, on the side radially further outward than an outer peripheral surface of the flange portion (13) of the valve rod (7), an outer peripheral edge portion of the lower surface (23a) of the cylinder portion (23) of the inner side spring presser (15) abuts against an upper surface of the upper side peripheral edge portion of the through hole (12a) of the biasing member (12) from the above, and a lower surface of the cylinder portion (24) of the outer side spring presser (16) abuts against an upper surface of the outer peripheral edge portion of the biasing member (12) from the above.

As each disc-shaped diaphragm spring (21) is made to be elastically deformed so that the protrusion amount is small downwardly with respect to that in the natural state where the central portion is in a protruded shape with respect to the peripheral edge portion, each disc-shaped diaphragm spring (21) desires to be elastically deformed so that the protrusion amount is large downwardly. According to this elastic force, the flange portion of the valve rod (7) is strongly pressed downwardly. By this pressing force, a diaphragm (6) is deformed to block the fluid inflow passage (2a).

In a state where the fluid inflow passage (2a) is blocked as illustrated in FIG. 1, as the operation air is introduced to the operation air introduction chamber (20), it is possible to obtain a state where the fluid inflow passage (2a) is released as illustrated in FIG. 2. In FIG. 2, as the operation air is introduced into the operation air introduction chamber (20), the piston (18) is pushed downwardly. According to this, by the piston (18) in which the lower surface of the downward projection portion (27) abuts against the upper surface of the outer side spring presser (16), the outer side spring presser (16) is pressed downwardly. At this time, since the operation air in the operation air introduction chamber (20) can flow to the side above the upper surface of the outer side spring presser (16) from the void which is formed between the outer peripheral surface of the shaft portion (22) of the inner side spring presser (15) and the peripheral surface of the through hole (18a) of the piston (18), the upper surface of the outer side spring presser (16) is pressed downwardly by the operation air, and the piston (18) and the outer side spring presser (16) move downwardly as one body. Accordingly, the outer peripheral edge portion of the biasing member (12) is pressed downwardly by the outer side spring presser (16), and is deformed (inverted) into a protrusion which is the reverse of the state illustrated in FIG. 1. Since a member which restricts the deformation to the reversed protrusion does not exist, each disc-shaped diaphragm spring (21) of the biasing member (12) is deformed until having the shape of the protrusion in the natural state, and accordingly, a force which biases the flange portion (13) of the valve rod (7) downwardly is substantially zero. The biasing member (12) is maintained in a state where the lower side peripheral edge portion of the through hole (12a) is received on the upper surface (14a) of the spring receiver (14).

By so doing, as the force which biases the flange portion (13) of the valve rod (7) downwardly is substantially zero, the diaphragm (6) is deformed to release the fluid inflow passage (2a) by a repulsive force (pressure of fluid according to usage condition) of itself.

In the diaphragm valve (1), in order to block the fluid inflow passage (2a) with respect to high-pressure fluid, a large downward force is required to be given to the valve rod (7), and it is possible to obtain the large downward force which can suppress even the high-pressure fluid as the central portion of the biasing member (12) is pressed by the inner side spring presser (15). As the generated force is at a contact position, that is, a supporting position between the inner side spring presser (15) and the biasing member (12), it is preferable that a diameter of this contact position be small. A level of pressing the central portion of the biasing member (12) by the inner side spring presser (15) can be adjusted by changing a screwing amount of the adjustment screw (19) without the diaphragm valve (1) being dismantled. Therefore, after the assembly, it is possible to adjust the biasing force of the biasing member (12) from the outside, and to stably obtain necessary pressure for blocking the fluid inflow passage (2a).

In addition, in the description above, the diaphragm valve (1) is described as an example of the fluid controller, but the above-described fluid controller actuator (9) can be employed in various fluid controllers in addition to the example.

INDUSTRIAL APPLICABILITY

According to the present invention, in a fluid controller actuator for driving a valve rod which is vertically moved to open and close a fluid passage, a configuration is simple and assembly does not take time and effort. Furthermore, after the assembly, since a biasing force of a biasing member can be adjusted from the outside, it is possible to contribute to improving a performance of the fluid controller actuator and a fluid controller which uses the same.

The invention claimed is:

1. A fluid controller actuator, comprising:
a casing which is attached above a body;
a biasing member which is configured by a plurality of disc-shaped diaphragm springs having a through hole at the central portion thereof, and biases a valve rod downwardly by a lower side peripheral edge portion of the through hole;
an inner side spring presser which presses an upper side peripheral edge portion of the through hole of the biasing member downwardly;
an outer side spring presser which presses an outer peripheral edge portion of the biasing member downwardly; and
an operation air introduction chamber which presses the outer side spring presser downwardly as operation air is introduced,
wherein, in a state where the operation air is not introduced into the operation air introduction chamber, the biasing member is elastically deformed so that a protrusion amount with respect to a shape of protrusion which is downward in a natural state is small, and biases the valve rod downwardly and the outer side spring presser upwardly, respectively, and, as the operation air is introduced into the operation air introduction chamber, the outer side spring presser is pressed downwardly, and the biasing member is deformed upwardly in a shape of protrusion, and
wherein the inner side spring presser has a shaft portion and a cylinder portion which is provided on a lower end portion of the shaft portion, and presses the upper side peripheral edge portion of the through hole of the biasing member by a lower end of the cylinder portion, the shaft portion penetrates the outer side spring presser and extends upwardly, and an adjustment screw which positions the inner side spring presser as the lower end abuts against an upper surface of the shaft portion of the inner side spring presser, is screwed to a top wall of the casing.

2. The fluid controller actuator according to claim 1, wherein, a counter plate is fixed to the casing at a position above the outer side spring presser, a piston provided with a through hole into which the shaft portion of the inner side spring presser is inserted is disposed between the top wall of the casing and the counter plate, the piston has a downward projection portion which penetrates the counter plate and in which a lower surface abuts against the upper surface of the outer side spring presser, the operation air introduction chamber into which the operation air is introduced is provided on an side above the piston, the operation air in the operation air introduction chamber can flow to a side above the upper surface of the outer side spring presser from a void formed between an outer peripheral surface of the shaft portion of the inner side spring presser and a peripheral surface of the through hole of the piston, and both of the piston and the outer side spring presser are pressed downwardly by the operation air when the operation air is introduced.

* * * * *